United States Patent
Pegot-Ogier et al.

(10) Patent No.: US 8,869,331 B2
(45) Date of Patent: Oct. 28, 2014

(54) DISMOUNTABLE MODULAR PLATFORM FOR WASTE DISPOSAL FACILITY

(75) Inventors: Jean-Jacques Pegot-Ogier, Montauban (FR); Michel-Jean Bosio, Montauban (FR)

(73) Assignee: Modulo Beton, Montauban (FR)

( * ) Notice: Subject to any disclaimer, the term of this patent is extended or adjusted under 35 U.S.C. 154(b) by 0 days.

(21) Appl. No.: 13/504,843

(22) PCT Filed: Oct. 30, 2009

(86) PCT No.: PCT/FR2009/052100
§ 371 (c)(1),
(2), (4) Date: Apr. 27, 2012

(87) PCT Pub. No.: WO2011/051573
PCT Pub. Date: May 5, 2011

(65) Prior Publication Data
US 2012/0216725 A1    Aug. 30, 2012

(51) Int. Cl.
*E01D 18/00* (2006.01)
*B65F 1/00* (2006.01)
*B65G 69/30* (2006.01)

(52) U.S. Cl.
CPC .............. *B65F 1/0033* (2013.01); *B65G 69/30* (2013.01)
USPC ............................................. 14/69.5; 108/25

(58) Field of Classification Search
CPC ...................................... B65G 69/30
USPC ............. 14/69.5; 193/38, 41; 254/88; 108/25
See application file for complete search history.

(56) References Cited

U.S. PATENT DOCUMENTS

| | | | | |
|---|---|---|---|---|
| 1,493,475 A | * | 5/1924 | Cook | 254/88 |
| 5,277,573 A | * | 1/1994 | Sullivan | 425/437 |
| 5,341,533 A | * | 8/1994 | Seitz | 14/69.5 |
| 5,395,179 A | * | 3/1995 | Kotani | 404/71 |
| 5,457,837 A | * | 10/1995 | Zuckerbrod | 14/69.5 |
| 6,418,675 B1 | * | 7/2002 | Peggs et al. | 52/102 |
| 6,532,708 B1 | * | 3/2003 | Baerveldt | 52/396.05 |
| 8,332,981 B2 | * | 12/2012 | Woo et al. | 14/69.5 |
| 2009/0255066 A1 | * | 10/2009 | Brock | 14/69.5 |

FOREIGN PATENT DOCUMENTS

| | | |
|---|---|---|
| EP | 1 561 708 A1 | 8/2005 |
| FR | 2 689 916 A1 | 10/1993 |
| FR | 2 899 212 A1 | 10/2007 |

* cited by examiner

*Primary Examiner* — Raymond W Addie
(74) *Attorney, Agent, or Firm* — Birch, Stewart, Kolasch & Birch, LLP

(57) ABSTRACT

The present invention relates to a device designed for the unloading of waste, which device consists of a raised platform (1) and of inclined access ramps (2), comprising a plurality of juxtaposed supporting elements (3) forming a raised horizontal surface (48), said supporting elements consisting of two vertical uprights (12) resting on a surface (8) having a deformation coefficient defined as a function of the use of the waste-disposal facility that is envisaged and allowing the movement of pedestrians and light or heavy vehicles and having a horizontal top cross member (13),
a plurality of access elements (4) forming at least one continuous inclined surface from the bearing surface (8) to the raised horizontal surface (48), said access elements consisting of two vertical uprights (12) resting on the bearing surface (8) and of an inclined top cross member (13), and
fastening means (17) between the supporting elements (3) and the access elements (4).

19 Claims, 7 Drawing Sheets

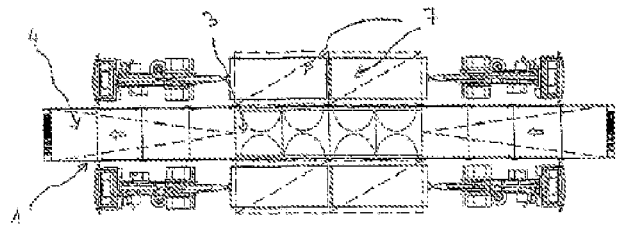
FIGURE 2-a
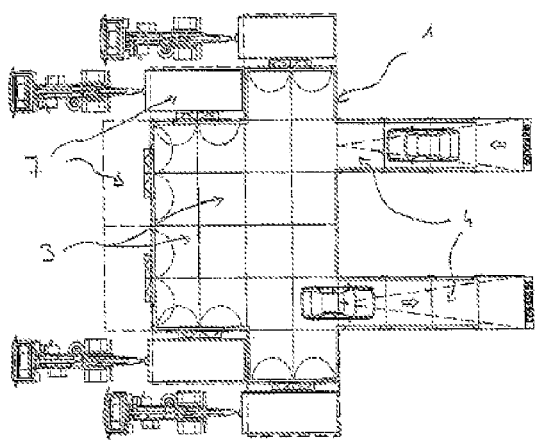
FIGURE 2-b
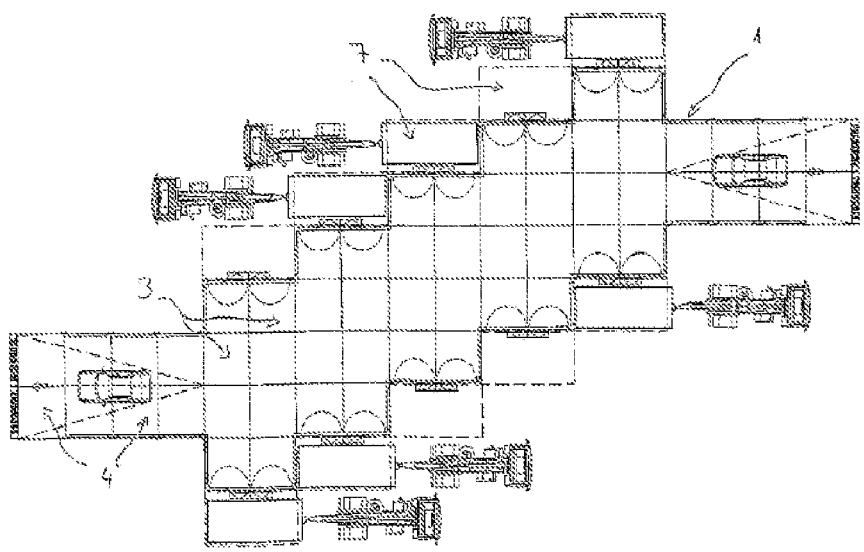
FIGURE 2-c

Figure 4B:
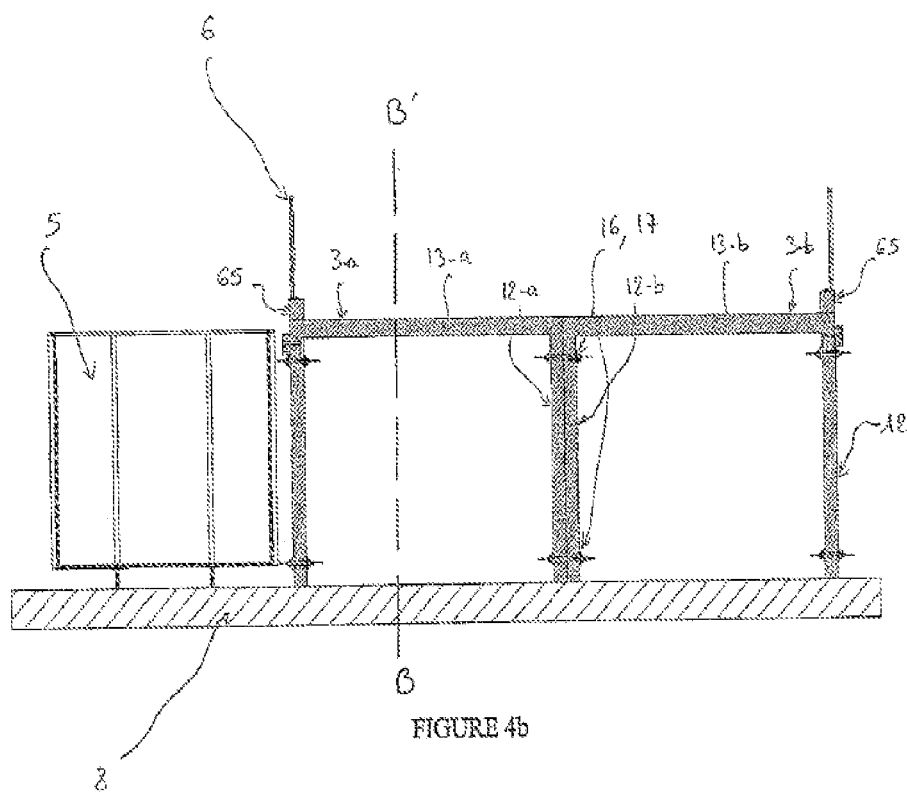

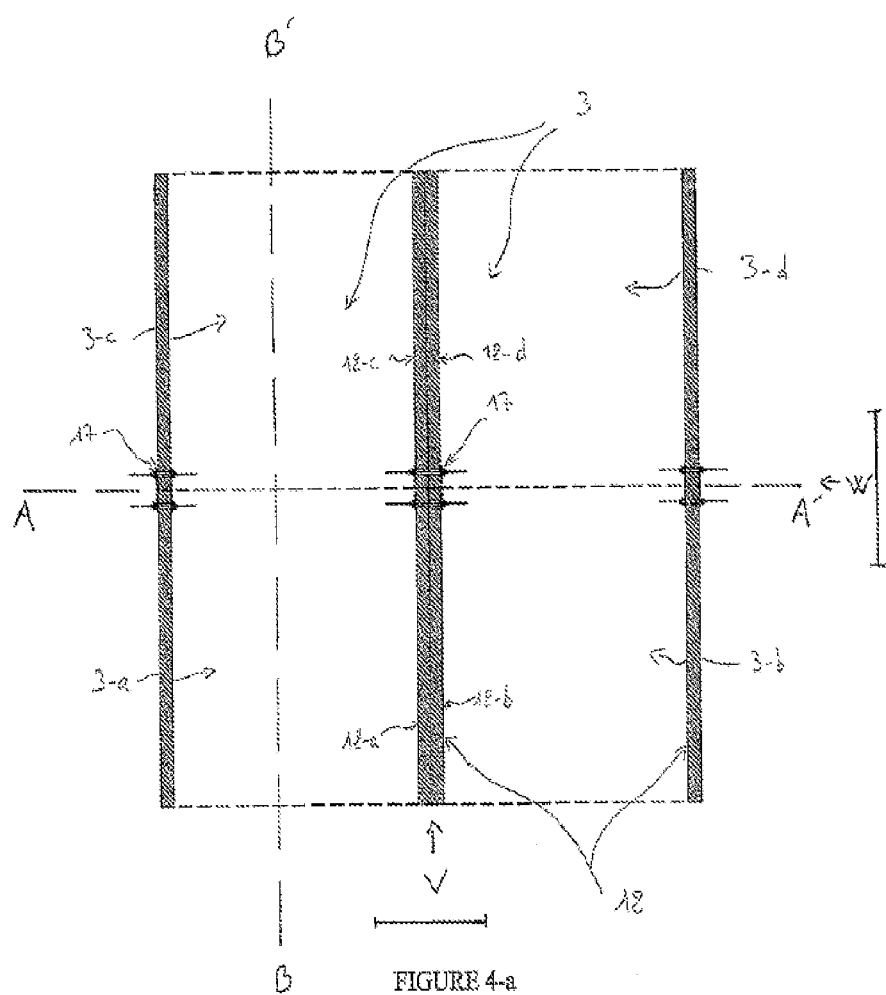
FIGURE 4-a

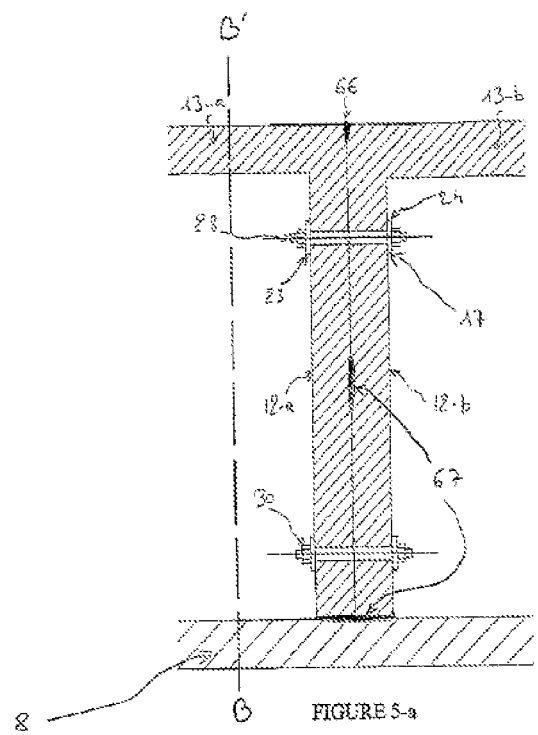
FIGURE 5-a
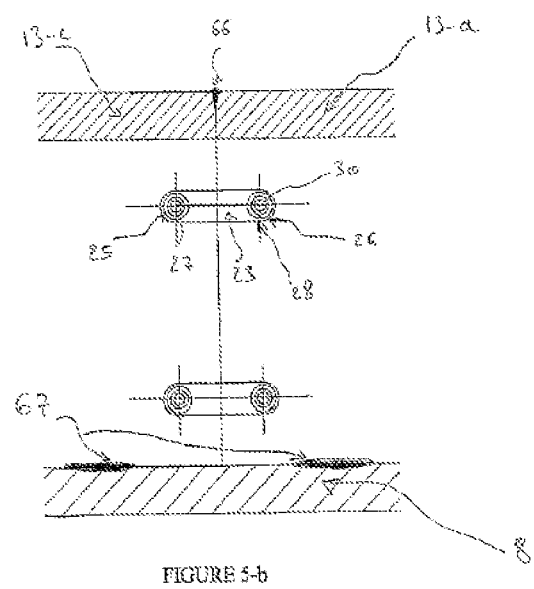
FIGURE 5-b

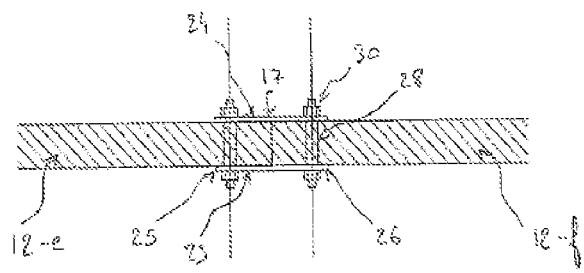
FIGURE 6-a
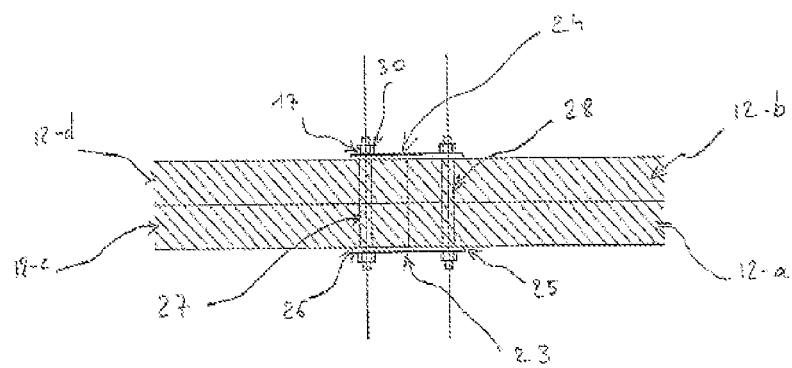
FIGURE 6-b

DISMOUNTABLE MODULAR PLATFORM FOR WASTE DISPOSAL FACILITY

The present invention relates to the field of installations designed for the collection of waste, and more particularly to the installations for unloading vehicles carrying waste.

Its subject is a modular device consisting of a raised platform and of access ramps resting on a bearing surface with specific properties, the platform and the ramps being assembled from elementary units positioned and held together by specific means.

The increasingly precise French and European regulations oblige the local authorities to provide sites for the collection of waste, and notably waste dumps where individuals can get rid of waste which is not taken by the garbage collectors. Ministerial circulars have reinforced the vigilance for a strict application of the rules for the operation of waste-disposal facilities, their good brand image with respect to consumers being greatly desired.

In order to meet these obligations, certain local authorities are making heavy investments to produce large-capacity collection centers. This usually involves items of equipment consisting of a platform fitted with inclined ramps allowing access to vehicles of variable tonnage with collection skips below. However, because of the rapid evolution of the urbanized zones and the changes in intercommunality, it is often difficult to predict the requirements in the long term. Finding appropriate land is often tricky and a choice that is appropriate at a given moment may turn out to be inappropriate a little later.

To allow a temporary installation on land of variable geometry, an item of modular equipment is proposed, consisting of a platform fitted with inclined ramps consisting of concrete elements being assembled in variable number depending on the desired configuration.

Patent application FR 93 07801 describes, for its part, an installation also made with the aid of modular elements. Skips placed one against the other are furnished at their top edge with a supporting floor which serves as a single apron that can support the vehicle from which the content is to be unloaded.

Patent application FR 92 02567 also describes an installation for gathering and sorting waste comprising a plurality of modular elements allowing the production of a platform that is raised relative to the ground, said elements being accessible via an access ramp, the skips here also being distributed below, along several edges of said platform. This structure requires the building of pillars designed to raise the assembly. Constricting to arrange and to articulate with the plates of the platform, these pillars form a weak point due to the concentration of the weight on a limited surface area and slow the construction of the installation. Incidentally they involve the construction of foundations on the ground in order to maintain the stability of said pillars and thereof of the whole structure (cf. page 5, 1.10). Because of this, the structure is not fully dismantable, the pillars remaining sealed onto the foundation.

These devices made of steel or aluminum sheets also have a limited resistance to the physical stresses, notably to the considerable loads that they are designed to support, and to the impacts during the maneuvers of the vehicles. The chemical attacks may also damage them either because of corrosive waste or of the bad weather. No particular protection is envisaged in the case of extremely climatic conditions (severe heat or frost making the platform impracticable). The deformations caused over the long term by their use most frequently prevent them from being reused on another site after dismantling. Moreover, the ground-level surface beneath the platform of these structures is not enclosed and remains totally unused.

The object of the present invention is to remedy these drawbacks. It consists of a modular item of equipment designed for the collection of waste. More precisely, the invention relates to a device designed for the unloading of waste, which device consists of a raised platform and of inclined access ramps, comprising:

a plurality of juxtaposed supporting elements forming a raised horizontal surface, said supporting elements consisting of two vertical uprights resting on a surface having a deformation coefficient defined as a function of the use of the waste-disposal facility that is envisaged and allowing the movement of pedestrians and light or heavy vehicles and having a horizontal top cross member, a plurality of access elements forming at least one continuous inclined surface from the bearing surface to the raised horizontal surface, said access elements consisting of two vertical uprights resting on the bearing surface and of an inclined top cross member, and fastening means between the supporting elements and the access elements.

Such a device is particularly suitable and easy to produce on a surface with the adequate mechanical strength properties based on modular supporting elements and modular access elements prefabricated in concrete. Preferably, the deformation coefficient of said bearing surface is greater than 0.22 MPa.

The advantages of a platform according to the invention are numerous:

a shape that can be modulated according to the desired capacity and to the geometry of the terrain, speed of construction by simple juxtaposition of the factory-prefabricated modules, with no fabrication of pillars or of foundations, installation on all surfaces that have the identified mechanical strength characteristics, creation of ground-level storage zones beneath the horizontal surface of the platform, easy cleaning, robust to all tests, fully dismantable and reassemblable without damage, transportable, not very costly.

Surprisingly, the applicant has imagined after several tests, unlike an a priori of those skilled in the trade, that it was in effect possible to dispense with the prior production of a slab formed for example of juxtaposed plates and of which the function is usually indispensible for supplying a flat horizontal and stable surface on which the supporting elements and the access elements can rest. It is thus well known in the art of producing structures made of modular elements that such a slab must have a ground coverage at least as large as the platform that it supports in order to ensure the sturdiness and stability of the assembly. Such slabs are usually also used to support waste-collection skips. The flatness and the stability of the slab therefore seemed indispensible for the cohesion of the device in its entirety and represented an unavoidable step, although it was restrictive in terms of time and resources in the production of this type of structure.

Going beyond this a priori, the juxtaposed supporting elements according to the present invention are thus resting on a simple bearing surface having the specific characteristics expressed as a deformation coefficient and forming a continuous raised horizontal surface capable of accommodating vehicles. The first step of the production of a slab is therefore removed. The problem of the bedding on the ground of the structure that is resolved in the conventional construction systems by a rigid slab is in this instance overcome by the strength properties of the bearing surface producing both a saving in terms of cost and of time.

Contrary to what might have been expected, the whole of the structure is not weakened by the absence of a slab but is conversely stronger, notably by virtue of a certain flexibility of the bedding on the ground allowing the whole structure to move and to expand in minute and relative proportions. This makes it precisely possible to prevent too great a rigidity exposing the whole structure to phenomena of cracking by the working of the stresses that operate between the vertical uprights and the slab on which they are resting in the conventional constructions. A better seismic strength is thus obtained.

Dispensing with the slab also has an advantage in that it makes it possible to obtain an accessible ground-level surface without unevenness due to the thickness of the slab. The accessibility of the zone situated beneath the platform is thus optimized as will be explained in detail below.

It is easy to understand that, for a given device, the vertical uprights of the supporting elements have a horizontal top ridge and all have the same height. Usually, a height will be chosen that is comparable to the height of the skips placed on the periphery of the device, from a model usually employed for the collection of waste.

"Bearing surface" according to the invention means any type of surface capable of allowing the construction of structures, notably made of concrete, designed to receive vehicles with a weight that may be up to several tons. The type of surface according to the invention may comprise, as an indication but not limiting, a coating of the asphalt concrete type, a metalling or a concrete raft that can support more than 0.22 MPa.

It is also understood that, for a given device, the vertical uprights of the access elements have an inclined top ridge and have variable heights making it possible to provide a progressive and continuous elevation from the ground level to the level of the platform.

Since the basic principle of the device according to the invention is modularity, it is highly recommended that each type of modular element forming the structure of the device (supporting modular elements, access modular elements) is made in a limited number of formats, preferably in a single format, said format constituting the unit of the module. The dimensions of these elements will preferably vary within the limit of modules having a height of less than 4 meters, a length of less than 10 meters and a width of less than 6 meters. All derivatives being possible in the range of the values of these three dimensions thus defined.

For reasons of strength of the materials, it will be advantageous for the vertical uprights to be placed on the shortest side of the supporting elements or of the access elements. In cross section, said supporting and access elements form modular elements having the shape of an inverted U, the branches of the U giving the width of the modular element in question. When the device according to the invention is assembled, the modular elements will be advantageously placed in the same direction. It will be possible, for example, to place a row of elements in line in the lengthwise direction. These elements, in contact via their U-shaped face, will be called "consecutive elements". It will also be possible to place a row of elements in line with the widthwise direction. These elements, in contact via the surface of their vertical upright, will be called "adjacent elements". Actually, in the most general case and according to the principle of modularity, a platform consists of several rows of consecutive and adjacent elements. These definitions extend to the elements of square, rectangular or triangular format. The computations of strength of the modular elements are applied without difficulty in order to establish the optimal dimensions and limits of the elements forming the device in the context set by the present invention.

Against all expectations in the absence of a distribution slab, the device according to the invention is characterized by its stability and its solidity, not only because of the characteristics specific to the modular elements composing it, but also because of the fastening means providing cohesion between the supporting elements and the access elements. These means for fastening the consecutive elements together require additional parts.

Surprisingly, the applicant has found, by virtue of the specific inverted U-shape of the modular elements used according to the invention and by virtue of their arrangement, that it was no longer necessary to make use of the prior production of a prefabricated distribution slab intended to stabilize the whole structure when the bearing surface had sufficient mechanical strength characteristics.

The shape of the modular elements used for the manufacture of a platform for a waste-disposal facility according to the invention also has the advantage of arranging beneath the platform a closed space consisting of as many "tunnels" as the platform has rows of modular elements. The ground-level zone is easily enclosed by the partitioning of the front and rear outside faces of the structure by means of rigid walls. Preferably, care will be taken to place, on at least one modular element allowing access to the ground-level zone, entrance means with one or more articulated opening elements. Preferably these entrance means will consist of any type of door capable of being closed securely or not. Entrance means may also be introduced to allow communication, beneath the horizontal surface of the platform, between several rows of modular elements.

To reinforce the solidity and cohesion of the device according to the invention, fastening means may be used. This fastening may be based on the chaining principle.

For example, said fastening means may comprise at least one system consisting of two rigid gusset plates fastened together at their ends by two threaded rods each passing through a vertical upright of said two consecutive elements. Thus, said rigid gusset plates are placed on either side of the vertical uprights and straddling two consecutive vertical uprights. The whole assembly is kept tight by nuts screwed onto the threading of said rods.

Provision may also be made to ensure cohesion by fastening four elements together, namely a first pair of consecutive elements placed adjacent to a second pair of consecutive elements.

For example, said fastening means comprise at least one system consisting of two rigid gusset plates fastened together at their ends by two threaded rods each passing through two adjacently placed vertical uprights of two pairs of consecutive elements. The whole assembly is kept tight by nuts screwed onto the threading of said rods.

For the purpose of optimizing the device and because of the value of having many elements of symmetry to increase the flexibility of combination of the modular elements and ensure a good cohesion of the assembly, the device according to the invention advantageously consists of elements of the same width.

For reasons of safety of the vehicles and of the people, a safety rail may be installed on the periphery of the platform. For this purpose, the supporting and access elements comprise means for fastening a safety rail that may consist for example of holes or spiking in which balustrades can be fastened. The safety rails may also be positioned on curbs placed on the periphery of the platform, said curbs making it possible to secure the platform against vehicles falling off.

Any strong and undeformable material may be used to produce the modules comprising the present device. Advantageously, the supporting elements and the access elements are prefabricated in concrete. This material has the advantage of conferring properties of stability and fire-resistance to the whole of the structure. In this manner, the ground-level zone notably meets safety standards, which makes it possible to obtain an enclosed space that can be used for various applications, and in particular as a location for storage of various products.

In one particular embodiment of the invention, provision is made to incorporate into at least one horizontal top cross member of the modular elements means for heating the platform. These means will be particularly useful in the event of unfavorable climatic conditions and notably in the event of frost. Preferably, these will be electrical resistors embedded in the concrete plates and supplied by any type of power source. Preferably they will be placed on the top plates of the supporting modular elements forming the flat surface of the platform.

It is also possible to imprint anti-slip patterns on the horizontal top cross members of the modular elements in order to prevent people from falling or vehicles from skidding.

Advantageously, seals may be placed on the surface of the supporting elements and of the access elements at the juxtapositions of each modular element. The flat surface of the platform will then slope slightly (of the order of one centimeter per meter) in order to allow rainwater to flow off the platform.

In the same manner, compression strips made of resilient material of the elastomer or rubber type may also be placed between the walls of the modular elements, at the contact zones of the vertical uprights in order to improve the cohesion and the isolation of the whole structure. These strips may also be used in the contact zone between the vertical uprights of the modular elements and the bearing surface, further easing the possibilities of expansion of the structure while making the contact zone uniform.

The device according to the invention is especially designed for the unloading of objects or materials from the platform into skips placed below. The collection of waste brought by vehicles is the main application thereof. However, any other application requiring a vehicle to be placed overhanging any receptacle is equally possible.

Other particular features and advantages of the invention will be better understood with the aid of the description and of the drawings given as nonlimiting examples below.

Figure 1:
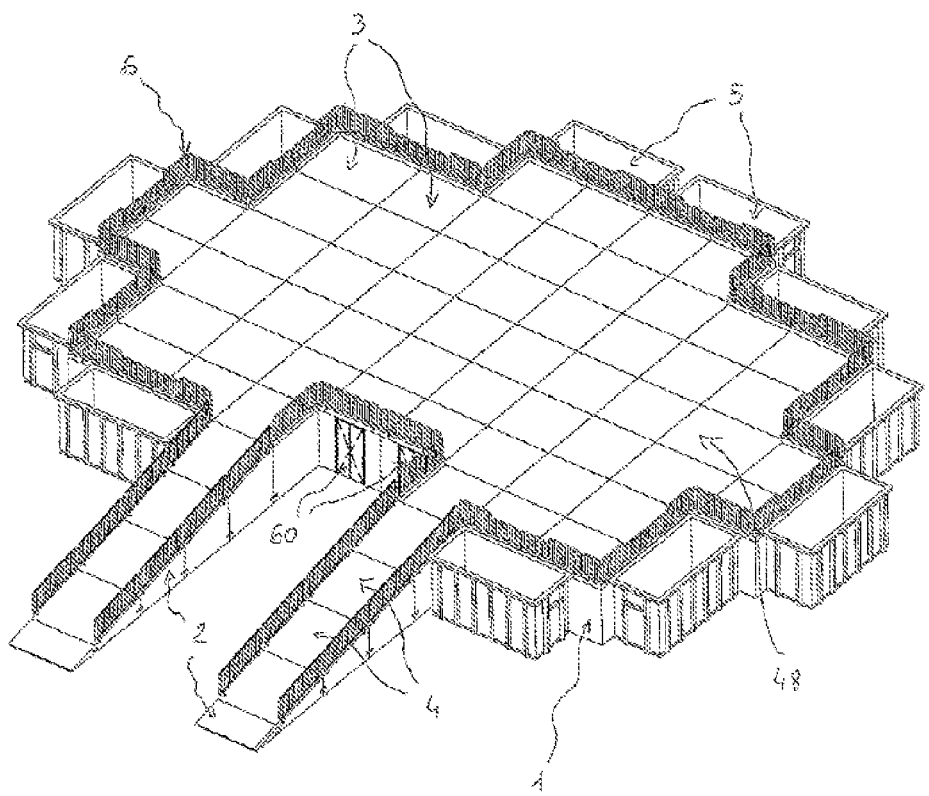

FIG. 1 represents an overview of a device for unloading waste.

FIGS. 2-*a*, 2-*b* and 2-*c* illustrate in a view from above three different configurations of an unloading device comprising a platform and one or two access ramps.

Figure 3:
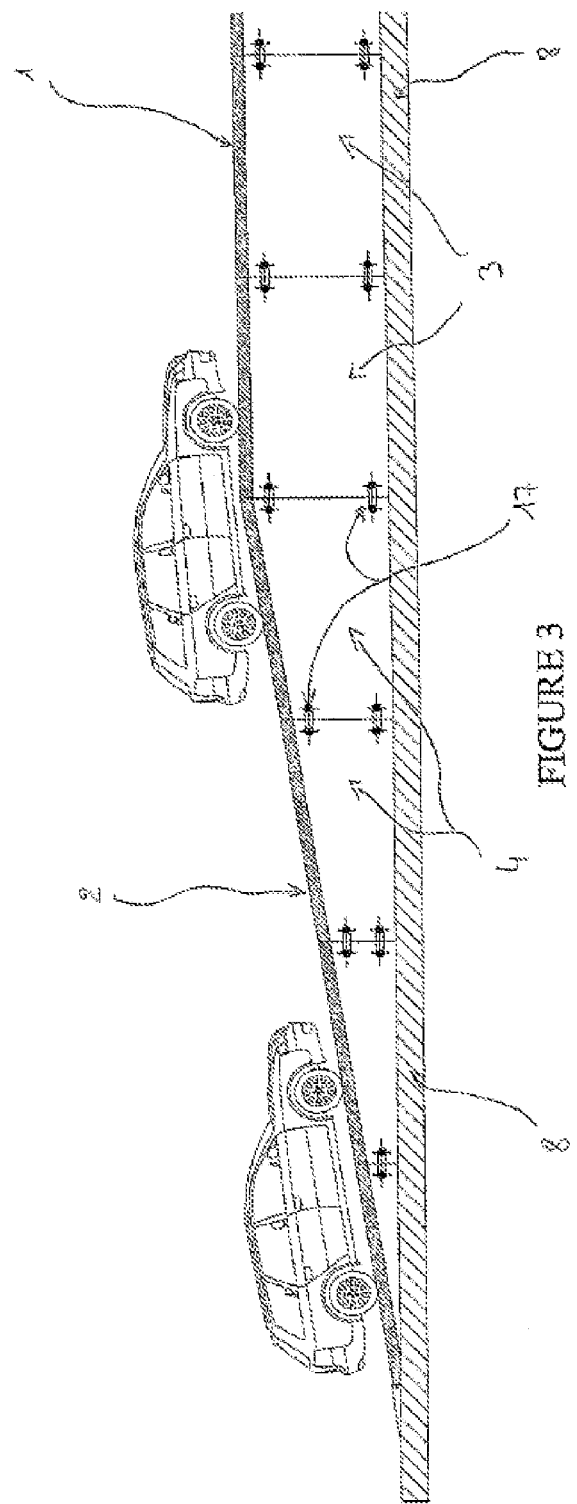

FIG. 3 is a lengthwise section of a ramp for access to a platform.

FIG. 4-*a* is a view in horizontal section of four supporting elements placed in two adjacent pairs of consecutive elements.

FIG. 4-*b* is a cross section of FIG. 4-*a* along an axis A-A' representing a skip adjacent to the platform and safety rails attached in line with the vertical uprights.

FIG. 5-*a* is an enlarged view of the cross section of FIG. 4-*a* along an axis A-A', facing the zone V, illustrating in detail a join between two supporting elements and the bearing surface.

FIG. 5-*b* is an enlarged view of a section B-B' of FIG. 4-*a* facing the zone W illustrating in detail a join between two supporting elements and the bearing surface.

FIG. 6-*a* represents in horizontal section a detail of the system for fastening two supporting elements.

FIG. 6-*b* represents in horizontal section a detail of the system for fastening four supporting elements.

FIG. 1 shows a three-dimensional view of an unloading platform 1 that can be accessed via two access ramps 2 and fitted with a safety rail 6. The raised platform 1 can be accessed via two inclined access ramps 2. Skips 5 serving as receptacles for the waste are placed on the ground and next to the platform 1 in various locations. The platform consists of 54 supporting elements 3 forming the horizontal surface 48. Each ramp 2 consists of 5 access elements 4. A safety rail 6 is installed on the periphery of the platform; it is interrupted level with the skips 5 in order to allow vehicles to approach and waste to be unloaded. Safety rails that open in the French style may be installed in front of the skips for the safety of the users. Entrance means represented by doors with two opening elements 60 allow access to the level of the ground-level zone situated under the platform.

FIGS. 2-*a*, 2-*b* and 2-*c* represent in a view from above three different configurations of the unloading device. The locations provided for the collection skips 5 are materialized by zones 7 marked on the ground and provided for this purpose.

FIG. 3 shows in lengthwise section a ramp 2 consisting of several access elements 4 extended by a succession of supporting elements 3 of the platform 1. The access elements 4 and the supporting elements 3 rest on the bearing surface 8. The fastening systems 17 are placed at the join of the various elements 3, 4.

FIG. 4-*a* shows in horizontal section four supporting elements 3 placed in two adjacent pairs of consecutive elements. The supporting elements 3 each consist of two vertical uprights 12 and one horizontal top cross member 13. The elements 3-*a* and 3-*b* are joined together by the surface of a vertical upright, respectively 12-*a* and 12-*b*, as the elements 3-*c* and 3-*d* are joined together by the surface of a vertical upright, respectively 12-*c* and 12-*d*. Furthermore, the elements 3-*a* and 3-*c* are consecutive, like the elements 3-*b* and 3-*d*. The joining of the four supporting elements 3 is provided by the fastening system 17. These supporting elements rest fully on the bearing surface 8.

FIG. 4-*b* represents two adjacent supporting elements 3, in cross section along the axis A-A' facing the zone V. The supporting elements 3-*a* and 3-*b* each consist of two vertical uprights 12 resting on the bearing surface 8, and of a horizontal top cross member 13. The vertical uprights 12-*a* and 12-*b* are in contact so that the cross members 13-*a* and 13-*b* of the supporting elements 3-*a* and 3-*b* form a continuous raised horizontal surface. Safety rails 6 are positioned on the supporting elements 3 and access elements 4, level with the outer vertical uprights of the platform, by means of fastening elements 65 of the curb type. Fastening means 16 are used between the supporting elements 3.

These fastening means are illustrated in detail in FIGS. 5-*a*, 5-*b* on the one hand and 6-*a*, 6-*b* on the other hand.

FIG. 5-*a* illustrates in section along the axis A-A' the detail of a join between the supporting elements 3 and the bearing surface 8. FIG. 5-*b* is a section of the same join along the axis B-B' facing the zone W. A seal 66 has been placed on the top surface in the contact zone between two supporting elements 13-a and 13-b. Compression strips 67 made of resilient material of the elastomer type have also been placed in the contact zones between the vertical uprights 12-a and 12-b between them and between the contact zones between the vertical uprights 12-a and 12-b and the bearing surface 8.

The four supporting elements 3 are fastened together by two systems 17 placed at different heights. Such a system 17 is shown in FIG. 6-b. It consists of two rigid gusset plates 23 and 24 fastened together at their ends 25 and 26 by two threaded rods 27 and 28. The rod 28 passes through the two adjacent vertical uprights 12-a and 12-b of the two adjacent elements 3-a and 3-b. The rod 27 passes through the two adjacent vertical uprights 12-c and 12-d of the two adjacent elements 3-c and 3-d. Nuts 30 keep said rods and said gusset plates of the system 17 tight.

FIG. 6-a shows a fastening system 17 of two consecutive supporting elements 3, this configuration being found on the periphery of the device. Two rigid gusset plates 23 and 24 are attached together at their ends 25 and 26 by two threaded rods 27 and 28. The rod 28 passes through the vertical upright 12-e. The rod 27 passes through the vertical upright 12-f. Nuts 30 keep said rods and said gusset plates of the system 17 tight.

As an indication, the stressing of a structure according to the invention is defined by the operating load of the concrete modules that compose it. The maximum pressure applied to the surface layer of a platform as claimed, accessible by vehicles of 3.5 tons on the 4-meter module, is 0.22 MPa.

This slight operating stress is very far from the stresses of the structures of roadway surfaces designed on the basis of the aggressiveness of the standard axle loaded to 13 tons and modeled by the reference pressure of standard twinning, namely 0.66 MPa.

The invention claimed is:

1. A device designed for the unloading of waste, comprising:
    a raised platform (1),
    inclined access ramps (2),
    a plurality of juxtaposed supporting elements (3) forming a raised horizontal surface (48), said supporting elements consisting of two vertical uprights (12) resting on a surface (8) having a deformation coefficient defined as a function of the use of the waste-disposal facility that is envisaged and allowing the movement of pedestrians and light or heavy vehicles and having a horizontal top cross member (13),
    a plurality of access elements (4) forming at least one continuous inclined surface from the bearing surface (8) to the raised horizontal surface (48), said access elements consisting of two vertical uprights (12) resting on the bearing surface (8) and of an inclined top cross member (13), and
    fastening means (17) between the supporting elements (3) and the access elements (4),
    characterized in that entrance means (60) with one or more articulated opening elements allowing access into the ground-level zone situated under the platform and previously partitioned are arranged on at least one modular element.

2. The device as claimed in claim 1, characterized in that the deformation coefficient of said bearing surface (8) is greater than 0.22 MPa.

3. The device as claimed in claim 1, characterized in that the supporting elements (3) and the access elements (4) form modular elements having the shape of an inverted U, the branches of the U giving the width of the modular element in question.

4. The device as claimed in claim 3, characterized in that the dimensions of the modular elements vary within the limit of modules having a height of less than 4 meters, a length of less than 10 meters and a width of less than 6 meters.

5. The device as claimed in claim 1, characterized in that it comprises fastening means (16) for fastening two consecutive elements (3, 4) together.

6. The device as claimed in claim 5, characterized in that the fastening means (16) comprise at least one system (17) consisting of two rigid gusset plates (23, 24) fastened together at their ends (25, 26) by two threaded rods (27, 28) each passing through a vertical upright (12) of two consecutive elements (3, 4).

7. The device as claimed in claim 1, characterized in that it comprises fastening means (16) for fastening four elements (3, 4) together, said elements being placed in a first pair of consecutive elements placed adjacent to a second pair of consecutive elements.

8. The device as claimed in claim 7, characterized in that the fastening means (16) comprise at least one system (17) consisting of two rigid gusset plates (23, 24) fastened together at their ends (25, 26) by two threaded rods (27, 28) each passing through two adjacently placed vertical uprights (12) of two pairs of consecutive elements (3, 4).

9. The device as claimed in claim 1, characterized in that it comprises a safety rail (6) on the periphery of the platform.

10. The device as claimed in claim 9, characterized in that said safety rails are positioned on the supporting elements (3) and access elements (4), preferably level with the outer vertical uprights (12) of the platform, by means of other fastening means (65).

11. The device as claimed in claim 1, characterized in that each supporting element (3) and access element (4) is a single piece prefabricated in concrete.

12. The device as claimed in claim 11, characterized in that at least one horizontal top cross member (13) of the modular elements comprises means for heating the platform.

13. The device as claimed in claim 1, characterized in that seals (66) are placed on the surface of the supporting elements (3) and of the access elements (4) at the juxtapositions of each modular element.

14. The device as claimed in claim 1, characterized in that compression strips (67) made of resilient material are placed between the walls of the modular elements, at the contact zones of the vertical uprights (12).

15. The device as claimed in claim 1, characterized in that the compression strips (67) made of resilient material are placed at the contact zone between the vertical uprights (12) of the modular elements and the bearing surface (8).

16. The device as claimed in claim 2, characterized in that the supporting elements (3) and the access elements (4) form modular elements having the shape of an inverted U, the branches of the U giving the width of the modular element in question.

17. The device as claimed in claim 2, characterized in that it comprises fastening means (16) for fastening two consecutive elements (3, 4) together.

18. The device as claimed in claim 3, characterized in that it comprises fastening means (16) for fastening two consecutive elements (3, 4) together.

19. The device as claimed in claim 4, characterized in that it comprises fastening means (16) for fastening two consecutive elements (3, 4) together.

* * * * *